(12) United States Patent
Care

(10) Patent No.: US 7,480,869 B2
(45) Date of Patent: Jan. 20, 2009

(54) METHOD AND APPARATUS FOR DISPLAYING STATUS OF HIERARCHICAL OPERATIONS

(75) Inventor: Jeffrey Eaton Care, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1354 days.

(21) Appl. No.: 10/698,505

(22) Filed: Oct. 31, 2003

(65) Prior Publication Data

US 2005/0097480 A1     May 5, 2005

(51) Int. Cl.
     *G06F 3/048*      (2006.01)
(52) U.S. Cl. ...................................... 715/766
(58) Field of Classification Search ............. 714/57, 714/810; 715/766, 740
See application file for complete search history.

(56) References Cited

U.S. PATENT DOCUMENTS

| 5,953,010 A | 9/1999 | Kampe et al. ............... 345/348 |
| 6,104,397 A | 8/2000 | Ryan et al. .................. 345/348 |
| 6,275,987 B1 | 8/2001 | Fraley et al. .................. 717/11 |
| 6,823,272 B2 | 11/2004 | Sutton .......................... 702/58 |
| 7,181,684 B2 * | 2/2007 | Chittu et al. ................. 715/255 |
| 7,265,762 B2 * | 9/2007 | Purdy .......................... 345/629 |

FOREIGN PATENT DOCUMENTS

GB     2378629     2/2003

\* cited by examiner

*Primary Examiner*—Shelly A Chase
(74) *Attorney, Agent, or Firm*—Duke W. Yee; Martin McKinley; Mari A. Stewart

(57) ABSTRACT

A method, apparatus, and computer instructions are disclosed for displaying the true status of hierarchical operations being performed in a data processing system. For example, a Z-order layering technique can be used to display simultaneously on a screen the status of a plurality of operations being performed on elements of a hierarchical structure, such as, for example, on an inverted tree directory and a plurality of its sub-trees. Advantageously, the display can be scaled to include operations being performed for many nested levels of the hierarchical structure, without having to increase the overall footprint of the display. Also, an application for copying a directory has to traverse the directory's structure only one time (e.g., during the copying operation), because the application does not need to know in advance the total number of files that have to be copied.

3 Claims, 6 Drawing Sheets

METHOD AND APPARATUS FOR DISPLAYING STATUS OF HIERARCHICAL OPERATIONS

BACKGROUND OF THE INVENTION

1. Technical Field

The present invention relates generally to the display of information in a data processing system, and in particular, but not exclusively, to a method, apparatus, and computer instructions for displaying the true status of hierarchical operations being performed in a data processing system.

2. Description of Related Art

Graphical user interfaces (GUIs) are data processing system program interfaces that, among other things, make it relatively easy for users to move data from one application to another. Typically, a user initiates such an operation with a GUI by utilizing a pointing device, such as a mouse, to select certain objects or commands on a display screen. Examples of such GUIs are those provided with the various versions of Microsoft Corporation's Windows Operating System (OS) and Apple Corporation's Macintosh OS.

GUIs are often used to monitor the progress of complex operations with numerous nested steps. For example, typical operations with numerous nested steps include such functions as copying directory trees, installing new software packages, or scanning data processing system files for viruses. However, a major drawback of the visual metaphors provided by GUIs for monitoring the progress of such operations is that these visual representations are flat in dimension and ultimately fail to portray the true status of the underlying operations being performed.

For example, a conventional GUI operation with numerous nested steps is the Windows file copy progress monitor, which is depicted as a screen of display in FIG. 1. As illustrated by the file copy progress monitor 10 in FIG. 1, only one progress bar 12 is displayed. However, the directory 14 being copied ("Portfolio") can have a large hierarchical structure of data files included within numerous sub-directories or sub-trees. Although the progress bar 12 shows the status of the overall copying operation at the directory level, the conventional GUI displays no useful information about the status of the copying operations also being performed at the sub-directory levels or on individual data files.

A conventional solution to this problem is to show additional progress bars as the copying operation traverses the structure of the directory involved. However, a major drawback of this solution is that it fails if more than three nested levels of operations are to be displayed, because the amount of screen space required for the conventional progress monitor increases linearly with the depth of the traversal operations being performed. Consequently, in order to display the progress of copying operations being performed for four or five nested levels (e.g., sub-directories) within a directory, the dialog box for such a progress monitor has to be exceedingly large.

Another major drawback of conventional file copy progress monitors is that the application that performs the copying operation is required to traverse the entire structure of the directory at least twice. For example, at the onset of the copying operation, the application performing the copying operation has to traverse the entire directory in order to determine just how many files have to be copied. Then, the application traverses the entire directory a second time, while the actual copying operation is being performed. In other words, the copying application has to determine the size of the copying operation, before the copying operation can be performed. Thus, the conventional application wastes precious processing time.

Therefore, it would be advantageous to have an improved method and apparatus for displaying the true status of hierarchical operations being performed in data processing systems, such as, for example, the true status of file copying operations.

SUMMARY OF THE INVENTION

The present invention provides a method, apparatus, and computer instructions for displaying the true status of hierarchical operations being performed in a data processing system. In an exemplary embodiment, a Z-order layering technique can be used to display simultaneously on a screen the status of a plurality of operations being performed on elements of a hierarchical structure, such as, for example, on an inverted tree directory and a plurality of its sub-trees. Advantageously, the display can be scaled to include operations being performed for many nested levels of the hierarchical structure, without having to increase the overall footprint of the display. Also, an application for copying a directory has to traverse the directory's structure only one time (e.g., during the copying operation), because the application does not need to know in advance the total number of files that have to be copied.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
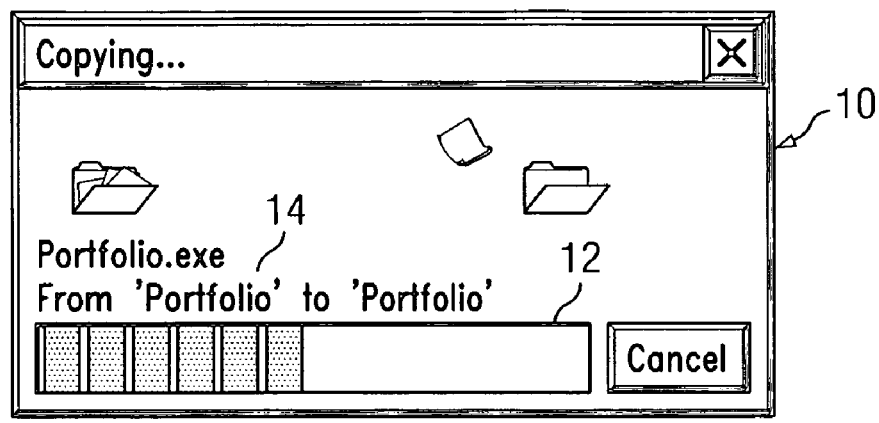
FIG. 1 is a screen of display showing a conventional file copy progress monitor.
Figure 2:
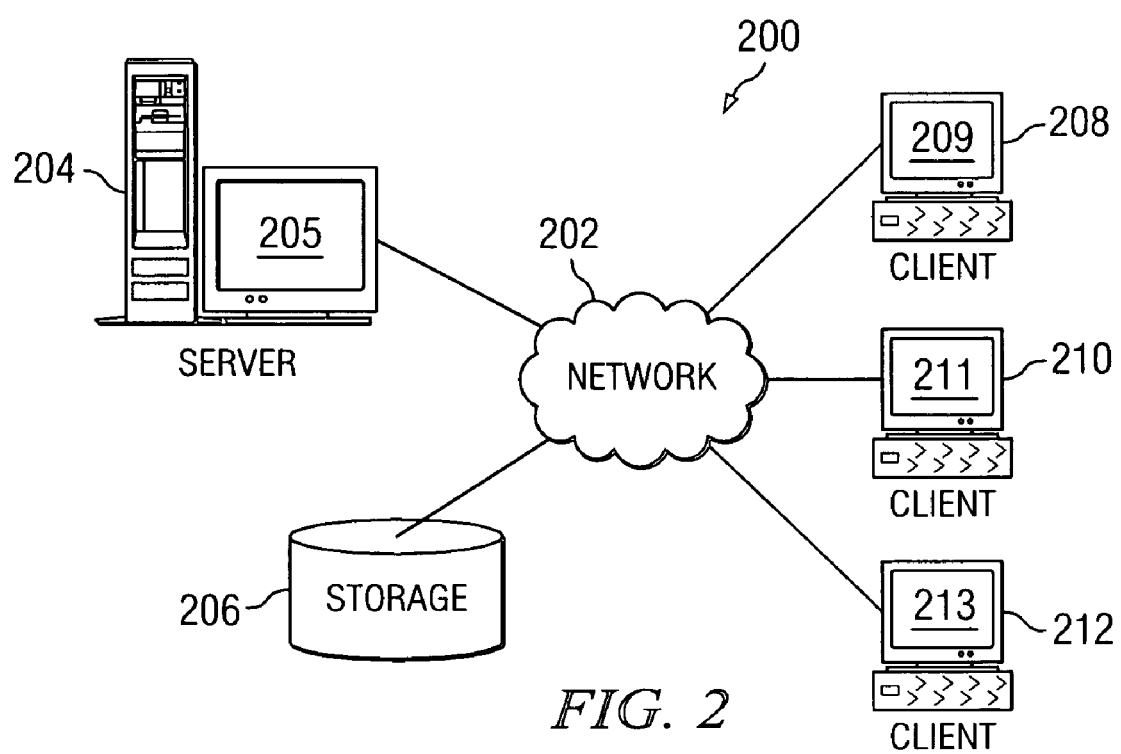
FIG. 2 depicts a pictorial representation of a network of data processing systems in which the present invention may be implemented.

With reference now to the figures, FIG. 2 depicts a pictorial representation of a network of data processing systems in which the present invention may be implemented. Network data processing system 200 is a network of computers in which the present invention may be implemented. Network data processing system 200 contains a network 202, which is a medium used to provide communications links between various devices and computers connected together within network data processing system 200. Network 202 may include connections, such as wire, wireless communication links, or fiber optic cables.

In the depicted example, server 204 is connected to network 202. Server 204 provides access to storage unit 206 for clients 208, 210, 212. Server 204 can include a monitor 205 for displaying resources associated with server 204. In addition, clients 208, 210, and 212 are connected to network 202. These clients 208, 210, and 212 may be, for example, personal computers or network computers. Clients 208, 210, 212 can include respective monitors 209, 211, 213 for displaying resources associated with clients 208, 210, 212. In the depicted example, server 204 may provide data, such as boot files, operating system images, and applications to clients 208, 210, and 212. Clients 208, 210 and 212 are clients with respect to server 204. Network data processing system 200 may include additional servers, clients, and other devices not shown.

In a preferred embodiment of the present invention, server 204 can provide data from storage unit 206. Data from storage unit 206 can include Web pages. The Web pages may be, for example, HyperText Markup Language (HTML) documents. For this exemplary embodiment, the Web pages can be different, dynamic Web pages with, for example, Active Server Page (ASP) code embedded therein, a Java applet associated therewith, and/or a Java Script embedded therein. Also, in a preferred embodiment of the present invention, data from storage unit 206 can include data associated with a hierarchical structure, such as, for example, data in a plurality of files within one or more directories, sub-directories, trees, inverted trees, sub-trees, and the like.

In the depicted example, network data processing system 200 can be the Internet with network 202 representing a worldwide collection of networks and gateways that use the known Transmission Control Protocol/Internet Protocol (TCP/IP) suite of protocols to communicate with one another. At the heart of the Internet is a backbone of high-speed data communication lines between major nodes or host computers, including thousands of commercial, government, educational and other computer systems that route data and messages. Of course, network data processing system 200 also may be implemented as a number of different types of networks, such as, for example, an intranet, internal network, local area network (LAN), or wide area network (WAN). In this regard, FIG. 2 is intended as an example, and not as an architectural limitation for the present invention.

Figure 3:
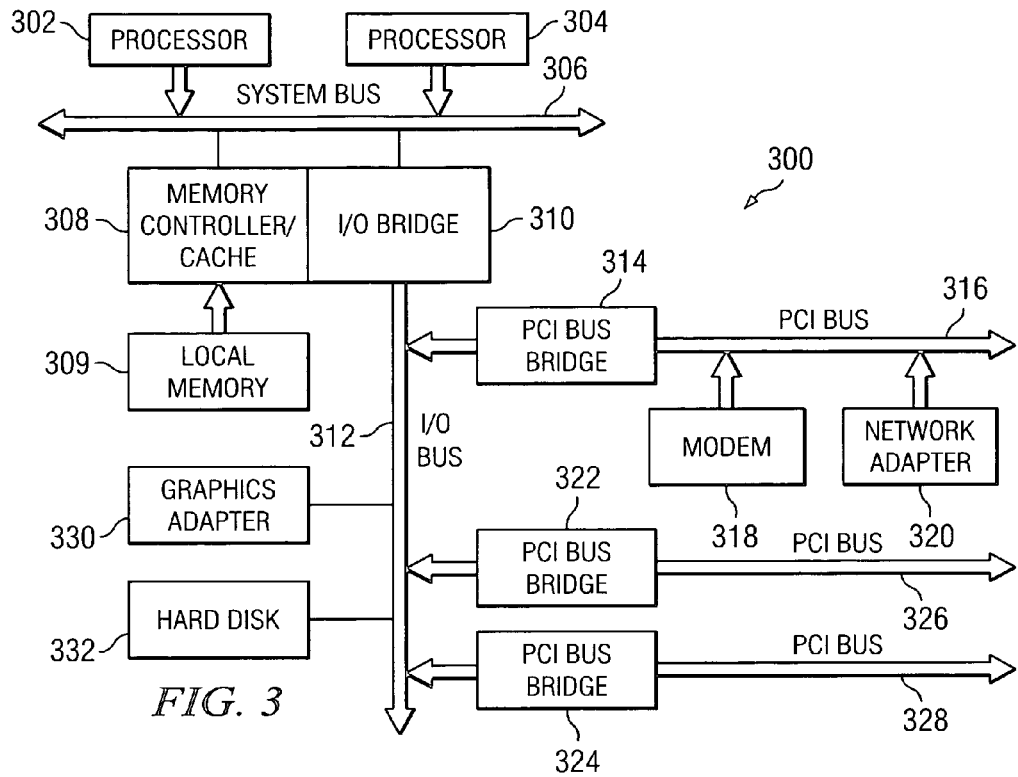
FIG. 3 is a block diagram of a data processing system that may be implemented as a server in accordance with a preferred embodiment of the present invention.

Referring to FIG. 3, a block diagram of a data processing system that may be implemented as a server, such as server 204 in FIG. 2, is depicted in accordance with a preferred embodiment of the present invention. Data processing system 300 may be a symmetric multiprocessor (SMP) system including a plurality of processors 302 and 304 connected to system bus 306. Alternatively, data processing system 300 may be a single processor system. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated, or separately configured as depicted.

Peripheral component interconnect (PCI) bus bridge 314 connected to I/O bus 312 provides an interface to PCI local bus 316. A number of modems may be connected to PCI local bus 316. Typical PCI bus implementations will support four PCI expansion slots or add-in connectors. Communications links to clients 208, 210, 212 in FIG. 2 may be provided through modem 318 and network adapter 320 connected to PCI local bus 316 through add-in boards.

Additional PCI bus bridges 322 and 324 provide interfaces for additional PCI local buses 326 and 328, from which additional modems or network adapters may be supported. In this manner, data processing system 300 allows connections to multiple network computers. A memory-mapped graphics adapter 330 and hard disk 332 may also be connected to I/O bus 312 as depicted, either directly or indirectly. Data processing system 300 can include a monitor, such as, for example, monitor 205 in FIG. 2 for displaying resources of data processing system 300.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM e-Server pSeries system, a product of International Business Machines Corporation in Armonk, N.Y., running the Advanced Interactive Executive (AIX) operating system or LINUX operating system.

Figure 4:
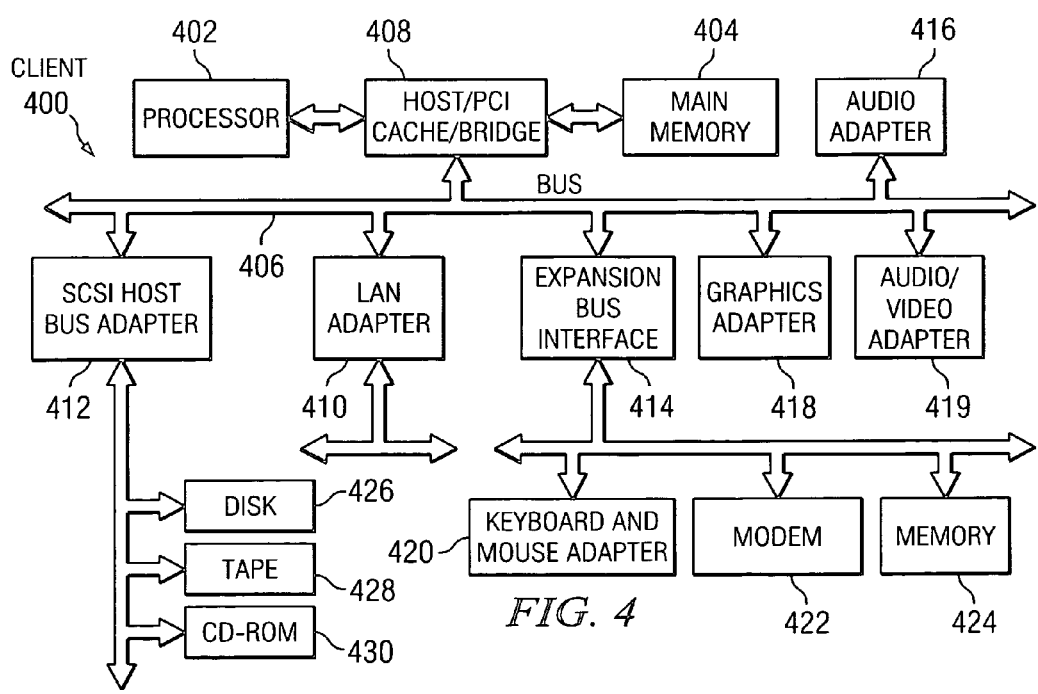
FIG. 4 is a block diagram of a data processing system that may be implemented as a client in accordance with a preferred embodiment of the present invention.

With reference now to FIG. 4, a block diagram of a data processing system that may be implemented as a client, such as one or more of clients 208, 210, 212 in FIG. 2, is depicted in accordance with a preferred embodiment of the present invention. For example, data processing system 400 in FIG. 4 can be a client processing unit, computer, workstation, etc. As shown, data processing system 400 can employ a PCI local bus architecture. However, although the depicted example employs a PCI bus, other bus architectures such as, for example, Accelerated Graphics Port (AGP) and Industry Standard Architecture (ISA) may be used. Processor 402 and main memory 404 are connected to PCI local bus 406 through PCI bridge 408. PCI bridge 408 also may include an integrated memory controller and cache memory for processor 402. Additional connections to PCI local bus 406 may be made through direct component interconnection or through add-in boards.

In the depicted example, local area network (LAN) adapter 410, small computer system interface (SCSI) host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 414 provides a connection for a keyboard and mouse adapter 420, modem 422, and additional memory 424. SCSI host bus adapter 412 provides a connection for hard disk drive 426, tape drive 428, and CD-ROM drive 430. Typical PCI local bus implementations will support three or four PCI expansion slots or add-in connectors. Data processing system 400 can include a monitor, such as, for example, one of monitors 209, 211, 213 in FIG. 2 for displaying resources of data processing system 400.

An OS runs on processor 402 and is used to coordinate and provide control of various components within data processing system 400 in FIG. 4. The OS may be a commercially available OS, such as Windows XP or Windows 2000, which are available from Microsoft Corporation. Also, for example, an object oriented programming system such as Java may run in conjunction with the OS and provide calls to the OS from Java programs or applications executing on data processing system 400. "Java" is a trademark of Sun Microsystems, Inc. Instructions for the OS, the object-oriented operating system, and applications or programs are located on storage devices, such as hard disk drive 426, and may be loaded into main memory 404 for execution by processor 402.

Those of ordinary skill in the art will appreciate that the hardware in FIG. 4 may vary depending on the implementation. Other internal hardware or peripheral devices, such as flash ROM (or equivalent nonvolatile memory) or optical disk drives and the like, may be used in addition to or in place of the hardware depicted in FIG. 4. Also, the processes of the present invention may be applied to a multiprocessor data processing system.

As another example, data processing system 400 may be a stand-alone system configured to be bootable without relying on some type of network communication interface, whether or not data processing system 400 includes some type of network communication interface. As a further example, data processing system 400 may be a Personal Digital Assistant (PDA) or similar device, which is configured with ROM and/or flash ROM in order to provide non-volatile memory for storing OS files and/or user-generated data.

The depicted example in FIG. 4 and above-described examples are not meant to imply architectural limitations. For example, data processing system 400 also may be a notebook computer or hand-held computer in addition to taking the form of a PDA. Also, data processing system 400 may be a kiosk or a Web appliance.

Essentially, the present invention provides a method, apparatus, and computer instructions for displaying the true status of hierarchical operations being performed in a data processing system, such as, for example, network data processing system 200 in FIG. 2. In an exemplary embodiment, the present invention uses a Z-order layering technique to display simultaneously on one screen the status of a plurality of operations being performed on elements of a hierarchical structure, such as, for example, on an "inverted tree" directory and a plurality of its sub-trees. Advantageously, in accordance with the present invention, the display can be scaled to include operations being performed for many nested levels of the hierarchical structure, without having to increase the overall footprint of the display. Also, in accordance with an exemplary embodiment of the present invention, an application used to copy a directory structure has to traverse the directory only one time (e.g., during the copying operation), because the application does not need to know in advance the total number of files that are to be copied.

Specifically, with reference to FIGS. 5A-5E, example related screens of display are illustrated for an exemplary file copy progress monitor 500 that can be created and displayed in accordance with a preferred embodiment of the present invention. For example, FIGS. 5A-5E can represent windows in a GUI for presenting resource information for a data processing system, such as network data processing system 200 in FIG. 2. Such windows as those depicted in FIGS. 5A-5E can be illustrative examples of progress information that may be presented on a display and/or monitor associated with a server, client or other type of processing unit, such as, for example, one or more of displays/monitors 205, 209, 211, 213 associated with server 204 and clients 208, 210, 212 in FIG. 2.

Figure 5A:
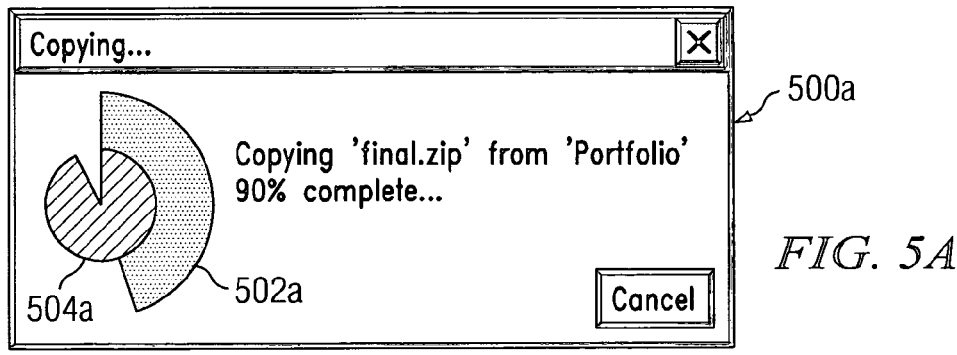
FIGS. 5A-5E are related screens of display illustrating an exemplary file copy progress monitor that can be created and displayed in accordance with a preferred embodiment of the present invention.
Figure 5B:
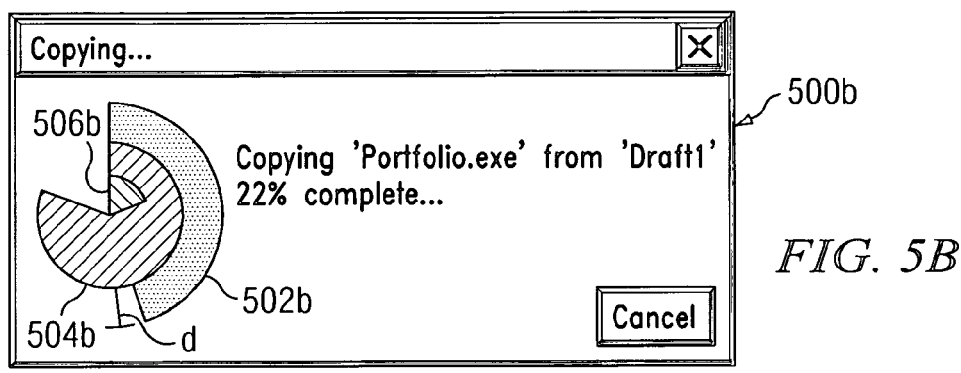
Figure 5C:
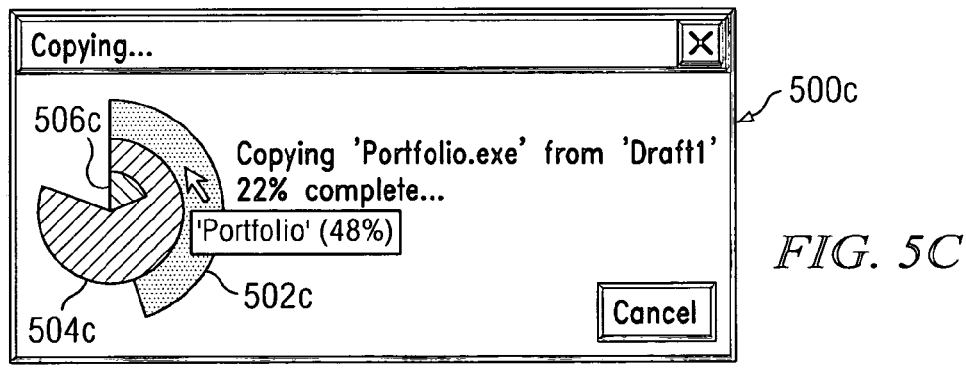
Figure 5D:
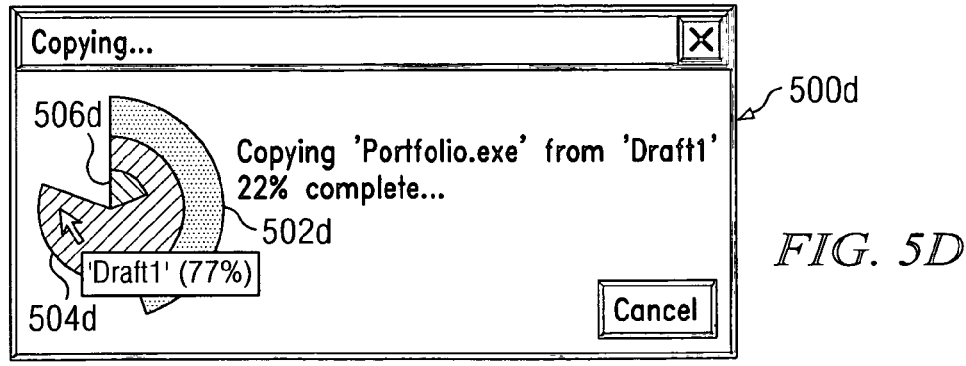
Figure 5E:
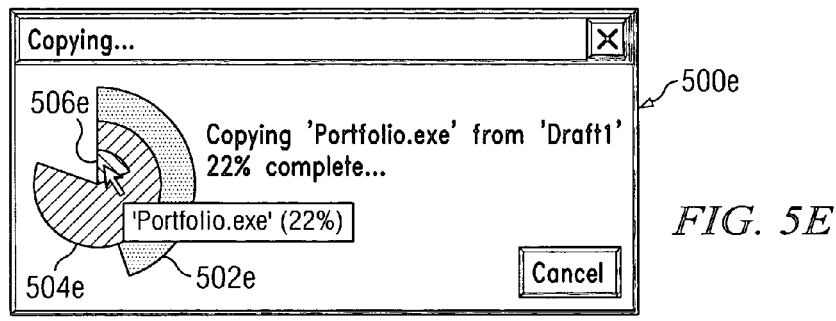
Figure 6A:
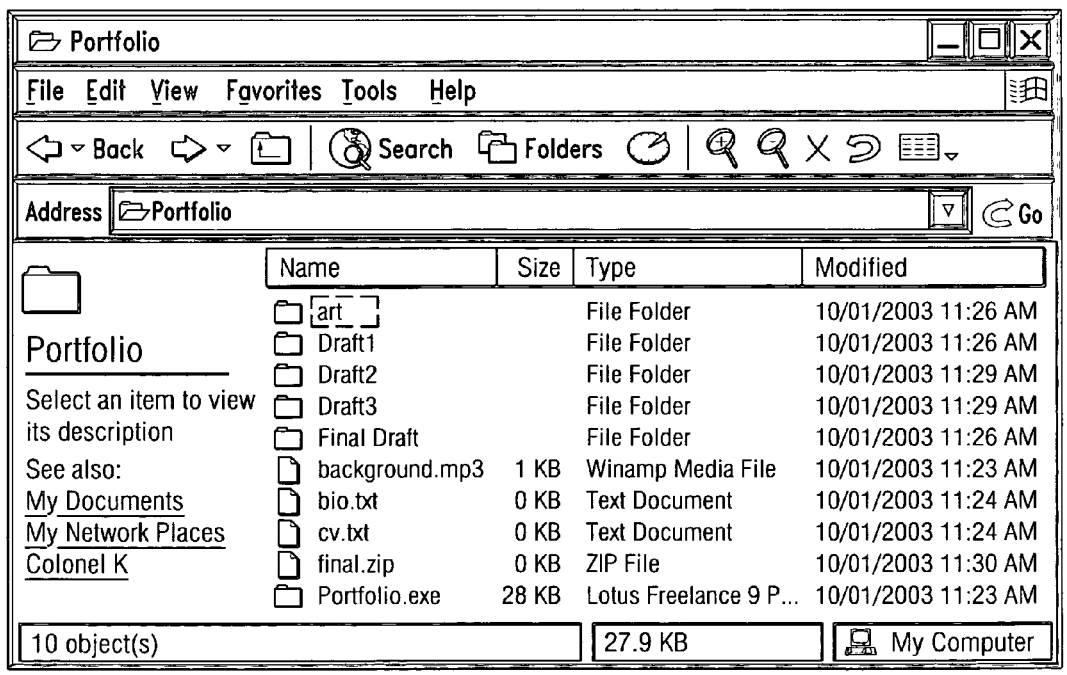
FIGS. 6A-6B are related screens of display illustrating an exemplary hierarchical structure that may be used in conjunction with FIGS. 5A-5E to describe the present invention.
Figure 6B:
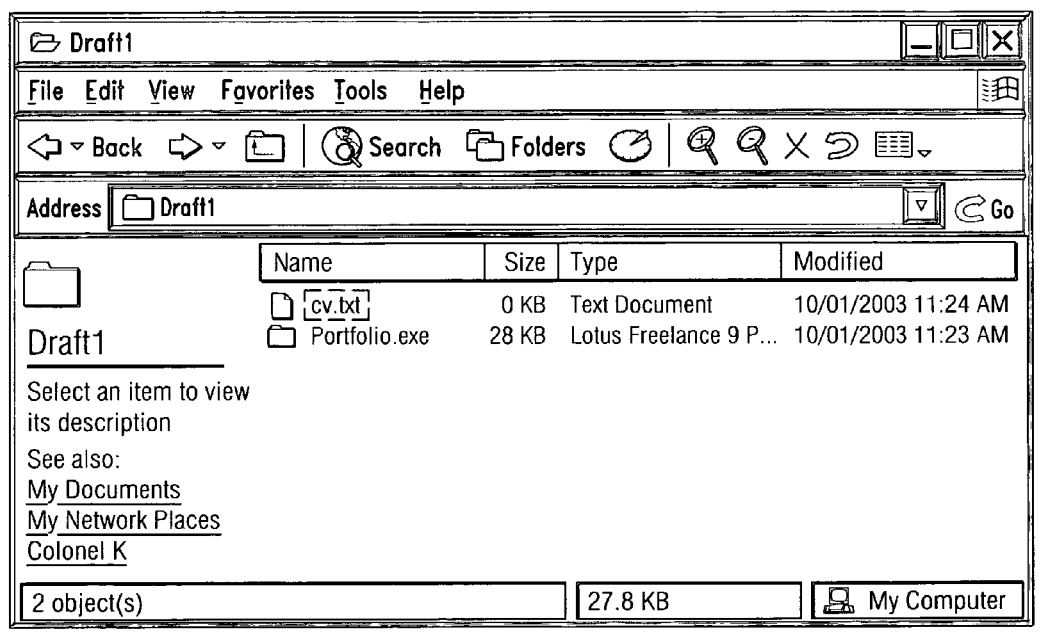

With reference now to FIGS. 6A-6B, example related screens of display are depicted for an exemplary hierarchical structure that can be used in conjunction with FIGS. 5A-5E to describe the present invention. For example, FIGS. 6A-6B can represent windows of a GUI that can be used for presenting the hierarchical structure of an exemplary directory "Portfolio" with respect to the file copying operations depicted in FIGS. 5A-5E.

Referring now to FIGS. 5A and 6A, the "topmost" or "outer" layer 502*a* of FIG. 5A can represent a progress indicator showing the progress of a current operation being performed. For example, using the exemplary directory "Portfolio" shown in FIG. 6A, the length of the progress indicator 502*a* in FIG. 5A shows that the copying operation being performed has completed copying less than 50% of the files in the directory "Portfolio". Simultaneously, the length of the progress indicator 502*b* in FIG. 5A shows that the copying operation being performed has completed copying 90% of the file "final.zip" 502*b,* which is included in the root folder (e.g., "Portfolio") being copied for a user, as shown in FIG. 6A.

Referring now to FIGS. 5B and 6A-6B, it can be seen that a third nested directory (e.g., sub-directory) has been encountered during the copy operation being performed, so a third layer 506*b* has been added to the window involved. For example, the length of the progress indicator 502*b* in FIG. 5B shows that the copying operation being performed has completed copying less than 50% of the files in the directory "Portfolio". Simultaneously, the length of the progress indicator 504*b* in FIG. 5B shows that the copying operation being performed has completed copying more than 75% of the files in the sub-directory "Draft1" as shown in FIGS. 6A-6B. Also, simultaneously, the length of the progress indicator 506*b* in FIG. 5B shows that the copying operation being performed has completed copying 22% of the file "Portfolio.exe" included in the sub-directory "Draft1" as shown in FIGS. 6A-6B. Notably, when all of the files in the sub-directory "Draft1" have been copied, the display of the third or inner layer 506*b* can be discontinued, until another nested sub-directory is encountered by the copying operation and can be represented by a display of the third or inner layer 506*b.* As such, the display of any such layer may be discontinued, once the operation on that nested level has been completed.

Notably, referring to exemplary window 500*b.* in FIG. 5B, it can be seen that a GUI control can be directed in accordance with the present invention, to automatically adjust the diameters of the upper/outer layers (e.g., progress indicators 502*b,* 504*b*), in order to make room for a new layer (e.g., progress indicator 506*c*) for display and also maintain the diameter of the inner/bottom layer (506*c*) constant in the dialog box of window 500*b.* Although there may be a practical limit to the number of nested operations the present invention can display in a window, this limit is significantly higher than that of any conventional technique currently used.

Also, in accordance with the present invention, FIGS. 5C-5E are provided to illustrate that a user can readily track the progress of the hierarchical operations being performed (e.g., copying operation, for this exemplary embodiment) for the highest layer and also any underlying layers, at any point during the operation(s) involved. For example, as the text that accompanies FIG. 5C illustrates, the progress of the overall operation being performed for the "Portfolio" directory is 48% complete. Also, referring to the text that accompanies FIG. 5D, the progress of the operation being performed for the "Draft1" sub-directory is 77% complete. Additionally, referring to the text that accompanies FIG. 5E, the progress of the operation being performed for the file "Portfolio.exe" is 22% complete. At this point, it is important to note that although the hierarchical operation described above is a copying operation, the present invention is not intended to be so limited. In this regard, any operation that an application can perform on a hierarchical structure, such as, for example, a horizontally oriented or vertically oriented directory, sub-directory, tree, inverted tree, sub-tree, and the like, whereby knowledge of the progress of some or all of the operations being performed is of value to a user, may be covered by the present invention.

Figure 7:
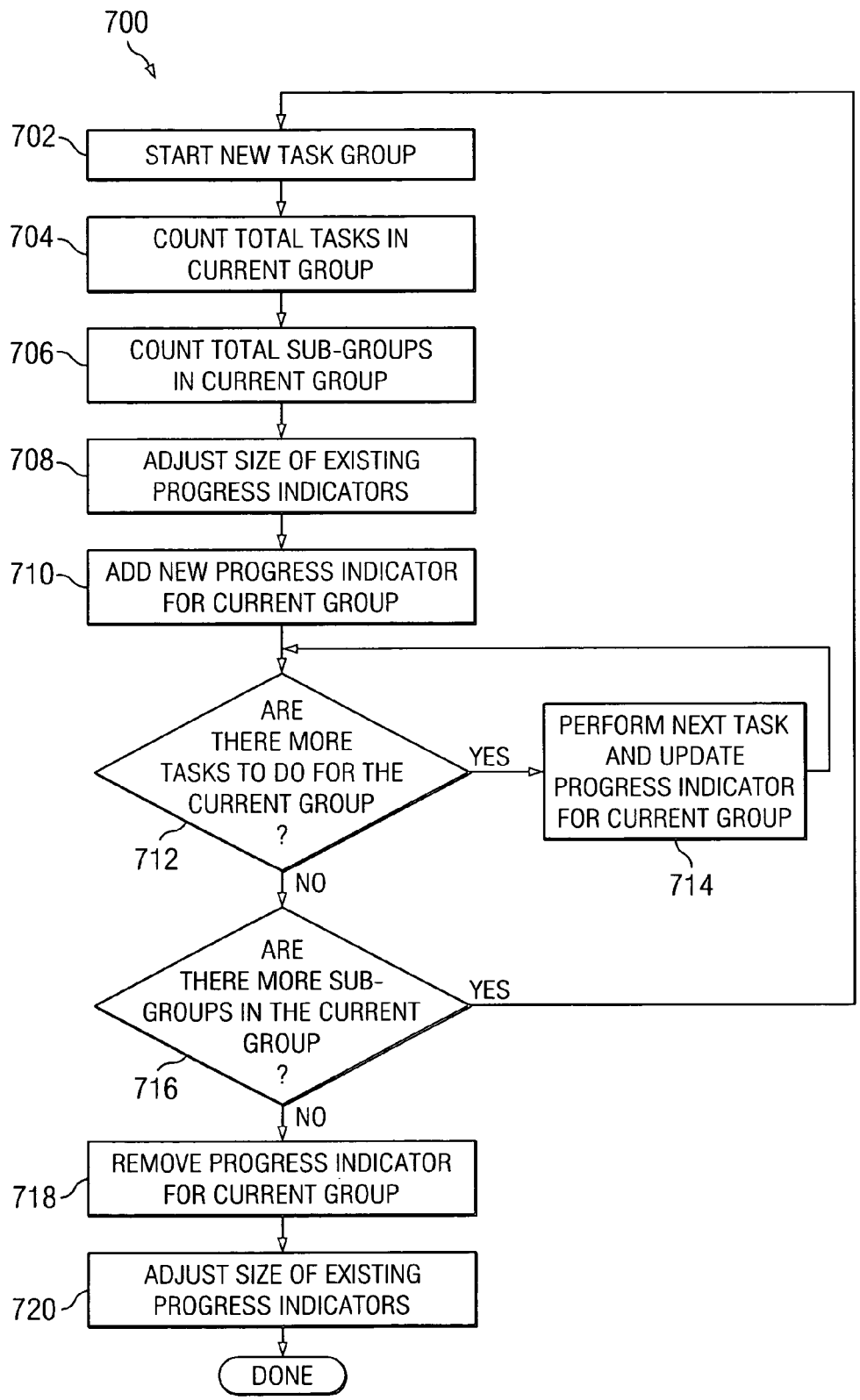
FIG. 7 is a flowchart depicting a method for monitoring the status of a plurality of hierarchical operations according to an exemplary embodiment of the present invention.

FIG. 7 depicts a flow showing a method for monitoring the status of a plurality of hierarchical operations according to an exemplary embodiment of the present invention. Referring to FIG. 7, in this exemplary method 700, the flowchart is entered at the start of a new task associated with an operation to be performed on a group of files (step 702). For example, referring also to the exemplary window 500b depicted in FIG. 5B, and the exemplary hierarchical structure depicted in FIGS. 6A and 6B, a software application preferably associated with a GUI (e.g., residing in a data processing unit 204, 208, 210, 212 in FIG. 2) initiates execution of a copy operation of the files in the exemplary directory "Portfolio". As this copy operation is being performed, the application determines the total number of tasks to be performed for the current operation (step 704). For example, at the root directory level (e.g., Portfolio), the application can determine that one copy operation is to be performed for all of the files within the root directory. Next, the application determines the number of sub-groups contained in the current group (step 706). For this example, the application can determine that the number of sub-groups contained in the root directory (Portfolio) is 10 (e.g., 5 sub-directories and 5 additional files) as shown in FIG. 6A. At this point, the application can adjust the size of any progress indicator preferably for display (step 708). For this exemplary embodiment, and at this point in the method, the progress indicator for the copy operation on the files in the root directory (Portfolio) is being created for display. Next, the application adds (preferably for display) a progress indicator for the current operation being performed (step 710). For this example, this progress indicator represents the progress of the copy operation being performed on the files in the root directory (Portfolio).

Next, the application determines whether or not there are more tasks to be performed for the current group (step 712). In other words, for this example, the application determines whether or not there are additional copy operations to be performed on the sub-directories or files in the root directory (Portfolio). At this point (e.g., the initial copy operation on the root directory), the answer is "No". Therefore, the flow proceeds to step 716). However, if the answer had been "Yes" at step 712, the flow would have proceeded to step 714. As described below, this can be the case for operations being performed at one or more of the nested levels (e.g., below the root directory) in the hierarchical structure involved.

Returning to step 716 (e.g., the answer at step 712 is "No"), the application determines whether or not there are any more sub-groups in the current group. In other words, for this example, the application determines whether or not there are any sub-directories and/or additional files in the root directory (Portfolio). For this example, the answer is "Yes". Therefore, in this case, the flow proceeds back to the first step (702) in the exemplary method. On the other hand, if the answer at step 716 had been "No", then the flow would proceed to step 718.

Returning to step 702 (e.g., the answer at step 716 is "Yes"), the application initiates an operation for a new task group. For this exemplary embodiment, the application initiates a copy operation for the files contained in a sub-directory (e.g., sub-directory "Draft1" in FIGS. 6A and 6B). As this copy operation is being performed, the application determines the total number of tasks to be performed for the current operation (step 704). For example, at this sub-directory level (e.g., Draft1), the application can determine that one copy operation is to be performed for each of the files within this sub-directory. Next, the application determines the number of sub-groups contained in the current group (step 706). For this example, the application can determine that the number of sub-groups contained in this sub-directory (Draft1) is 2 (e.g., 2 files) as shown in FIG. 6B. At this point, the application can adjust the size of any progress indicator preferably for display (step 708) of the progress of the copy operation for the files in this sub-directory (e.g., Draft1). For this exemplary embodiment, and at this point in the method, the progress indicator for the copy operation on the files in this sub-directory (Draft1) is being created for display. Next, the application adds (preferably for display) a progress indicator for the current operation being performed (step 710). For this example, this progress indicator represents the progress of the copy operation being performed on the files in this sub-directory (Draft1). As such, in accordance with the present invention, the exemplary application can provide for display a Z-order layering of a plurality of progress indicators for copy operations being performed on both the root directory (Portfolio) and the sub-directory (Draft1). For this exemplary embodiment, the term "Z-order" is defined as the 3-dimensional depth order in which elements can be displayed, for example, in a window or similar view. Progress indicators 502b-502e and 504b-504e in exemplary windows 500b-500e of FIGS. 5B-5E illustrate this example.

Next, the application determines whether or not there are more tasks to be performed for the current group (step 712). In other words, for this example, the application determines whether or not there are additional copy operations to be performed on the files in the sub-directory (Draft1). At this point (e.g., the initial file copy operation on the sub-directory), the answer is "Yes" (e.g., a second file is still to be copied). In this case, the application performs the task (e.g., copy operation for the first file "cv.txt") in the sub-directory (see FIG. 6B), and updates the appropriate progress indicator (e.g., 504b-504e of FIGS. 5A-5B) for display (step 714). The flow then returns to step 712.

If the application determines there are still more tasks to be performed for the current group (step 712), the application performs the task (e.g., copy operation for the second file "Portfolio.exe") in the sub-directory (see FIG. 6B), and updates (e.g., adjusts the size or width of) the appropriate progress indicator (e.g., 504b-504e of FIGS. 5A-5B) accordingly for display (step 714). For this exemplary embodiment, "width" may be defined as the distance across a progress indicator (e.g., distance d for progress indicator 502b in FIG. 5B). The flow then returns to step 712. In this example, there are no additional files to be copied, so the flow proceeds to step 716. Notably, in accordance with the present invention, the exemplary progress indicators 502b-502e, 504b-504e and 506b-506e shown in FIGS. 5B-5E illustrate the progress of the hierarchical operations being performed (e.g., copy operations for a root directory Portfolio, a sub-directory Draft1, and a file Portfolio.exe in the sub-directory, and advantageously, the progress indicators 502b-502e, 504b-504e and 506b-506e are simultaneously displayed.

Returning to step 716 (e.g., the answer at step 712 is "No"), the application determines whether or not there are any more sub-groups in the current group. For this example, the answer at this point is "No". In this case, and for this exemplary embodiment, the copy operation on the file Portfolio.exe is complete. Therefore, the application removes the progress indicator for this file from display (step 718), and adjusts the size (e.g., width) of the other progress indicators accordingly to account for this removal. In other words, referring to FIG. 5E for this example, the progress indicator 506e for the file Portfolio.exe is removed, and the progress indicators 502e, 504e can be adjusted (e.g., enlarged, widened, etc.) to compensate for the removal of progress indicator 506e in the dialog box for window 500e. Advantageously, in accordance with the present invention, a display of the progress of hierarchical operations being performed in a data processing system can be scaled to include operations for many nested levels of the hierarchical structure, without having to increase the overall footprint of the display.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for presenting status information associated with a hierarchical operation, the method comprising the steps of:

determining a total number of tasks to be performed for a particular hierarchical operation;

determining a number of sub-groups contained in the particular hierarchical operation;

displaying a plurality of status indicators in a view, wherein each status indicator of the plurality of status indicators indicates a progress of the particular hierarchical operation being performed, wherein the particular hierarchical operation is performed for a corresponding one of the each status indicator, wherein the particular hierarchical operation comprises an operation performed on a hierarchical structure and having a plurality of nested operations; and arranging the plurality of the status indicators in a Z-order layering in the view, wherein the view is one of a dialog box and a window, wherein the Z-order layering displays simultaneously on one screen the status of the plurality of nested operations of the particular hierarchical operation being performed on elements of the hierarchical structure, wherein the arranging step further comprises arranging the each status indicator of the plurality of status indicators in a circular pattern; wherein the each status indicator of the plurality of status indicators is defined in the view by an inner diameter, an outer diameter, and a length; wherein the length is associated with the status of the particular hierarchical operation, wherein the inner diameter and the outer diameter define a width for the each status indicator, and wherein the width is adjustable for at least one of the each status indicator so as to maintain a substantially constant diameter for the circular pattern.

2. A data processing system for presenting status information associated with a hierarchical operation, the data processing system comprising:

a processor;

a memory connected to the processor; and a set of instructions included in the memory, the processor configured to execute the set of instructions to:

determine a total number of tasks to be performed for a particular hierarchical operation;

determine a number of sub-groups contained in the particular hierarchical operation;

display a plurality of status indicators in a view, wherein each status indicator of the plurality of status indicators indicates a progress of the particular hierarchical operation being performed;

perform the particular hierarchical operation for a corresponding one of the each status indicator, wherein the particular hierarchical operation comprises an operation performed on a hierarchical structure and having a plurality of nested operations; and arrange the plurality of the status indicators in a Z-order layering in the view, wherein the view is one of a dialog box and a window, wherein the Z-order layering displays simultaneously on one screen the status of the plurality of nested operations of the particular hierarchical operation being performed on elements of the hierarchical structure, wherein the arranging step comprises further instructions to arrange the each status indicator of the plurality of status indicators in a circular pattern, wherein the each status indicator of the plurality of status indicators is defined in the view by an inner diameter, an outer diameter, and a length; wherein the length is associated with the status of the particular hierarchical operation, wherein the inner diameter and the outer diameter define a width for the each status indicator, and wherein the width is adjustable for at least one of the each status indicator so as to maintain a substantially constant diameter for the circular pattern.

3. A computer program product on a computer readable medium, the computer program product comprising:

instructions for determining a total number of tasks to be performed for a particular hierarchical operation;

instructions for determining a number of sub-groups contained in the particular hierarchical operation;

instructions for displaying a plurality of status indicators in a view, wherein each status indicator of the plurality of status indicators indicates a progress of the particular hierarchical operation being performed, wherein the particular hierarchical operation is performed for a corresponding one of the each status indicator, wherein the particular hierarchical operation comprises an operation performed on a hierarchical structure and having a plurality of nested operations; and instructions for arranging the plurality of the status indicators in a Z-order layering in the view, wherein the view is one of a dialog box and a window; wherein the Z-order layering displays simultaneously on one screen the status of the plurality of nested operations of the particular hierarchical operation being performed on elements of the hierarchical structure; wherein the arranging step further comprises instructions for arranging the each status indicator of the plurality of status indicators in a circular pattern; wherein the each status indicator of the plurality of status indicators is defined in the view by an inner diameter, an outer diameter, and a length; wherein the length is associated with the status of the particular hierarchical operation, wherein the inner diameter and the outer diameter define a width for the each status indicator, and wherein the width is adjustable for at least one of the each status indicator so as to maintain a substantially constant diameter for the circular pattern.

* * * * *